US011748414B2

(12) United States Patent
Mohanty et al.

(10) Patent No.: US 11,748,414 B2
(45) Date of Patent: Sep. 5, 2023

(54) METHODS AND SYSTEMS OF OPERATING COMPUTERIZED NEURAL NETWORKS FOR MODELLING CSR-CUSTOMER RELATIONSHIPS

(71) Applicants: Priyadarshini Mohanty, Los Angeles, CA (US); Pullak Kumar Mohanty, Los Angeles, CA (US)

(72) Inventors: Priyadarshini Mohanty, Los Angeles, CA (US); Pullak Kumar Mohanty, Los Angeles, CA (US)

( * ) Notice: Subject to any disclaimer, the term of this patent is extended or adjusted under 35 U.S.C. 154(b) by 983 days.

(21) Appl. No.: 16/445,200

(22) Filed: Jun. 18, 2019

(65) Prior Publication Data
US 2020/0159778 A1    May 21, 2020

Related U.S. Application Data

(60) Provisional application No. 62/686,681, filed on Jun. 19, 2018.

(51) Int. Cl.
*G06F 16/9032*     (2019.01)
*G06N 3/049*       (2023.01)
(Continued)

(52) U.S. Cl.
CPC ...... *G06F 16/90332* (2019.01); *G06F 40/284* (2020.01); *G06N 3/048* (2023.01);
(Continued)

(58) Field of Classification Search
CPC ...... G06N 3/0445; G06N 3/0454; G06N 3/08; G06N 20/00; G06N 3/084; G06N 3/088;
(Continued)

(56) References Cited

U.S. PATENT DOCUMENTS

11,228,379 B1 *   1/2022  O'Shea .............. H04B 17/3912
2018/0129742 A1 * 5/2018  Li ...................... G06V 30/194
(Continued)

*Primary Examiner* — Khalid W Shaheed (57) ABSTRACT

In one aspect, a computerized method for operating computerized neural networks for modelling CSR-customer relationships includes the step of receiving a user query. The user query comprises a set of digital text from a customer as input into an online CSR system. The method includes the step of filtering out unnecessary content of the user query. The method includes the step of splitting filtered user query in a sentence wise manner. The method includes the step of feeding the tokenized user query into a contextualized word representation model. The method includes the step of generating a set of context-aware feature vectors from the contextualized word representation model. With the set of context-aware feature vectors, the method implements a decision-making function to generate an identified customer query. The method includes the step of receiving an agent response, wherein the agent response is a response to the user query, and wherein the agent response comprises a set of digital text from an agent. With an LSTM network, the method generates a user query tensor vector. With the LSTM network, generating an agent query tensor vector. The method includes the step of concatenating the user query tensor vector and the agent query tensor vector to produce a single tensor, wherein the single tensor is processable by a neural network.

7 Claims, 7 Drawing Sheets

(51) Int. Cl.
  *G06Q 30/0201* (2023.01)
  *G06F 40/284* (2020.01)
  *G06Q 10/0639* (2023.01)
  *G06Q 30/01* (2023.01)
  *G06Q 30/0282* (2023.01)
  *G06N 3/048* (2023.01)

(52) U.S. Cl.
  CPC ....... *G06N 3/049* (2013.01); *G06Q 10/06393* (2013.01); *G06Q 30/01* (2013.01); *G06Q 30/0201* (2013.01); *G06Q 30/0282* (2013.01)

(58) Field of Classification Search
  CPC .......... G06N 5/046; G06N 3/02; G06N 5/003; G06V 10/82; G06V 10/454; G06V 20/41; G06V 40/172
  See application file for complete search history.

(56) References Cited

U.S. PATENT DOCUMENTS

| | | | |
|---|---|---|---|
| 2019/0197109 A1* | 6/2019 | Peters | G06F 40/295 |
| 2019/0287685 A1* | 9/2019 | Wu | G06F 40/30 |
| 2020/0105272 A1* | 4/2020 | Wu | G06N 3/08 |

* cited by examiner

METHODS AND SYSTEMS OF OPERATING COMPUTERIZED NEURAL NETWORKS FOR MODELLING CSR-CUSTOMER RELATIONSHIPS

CROSS-REFERENCE TO RELATED APPLICATIONS

This application claims priority to U.S. provisional patent application No. 62/686,681, titled METHODS AND SYSTEMS FOR REAL TIME EVALUATION OF CUSTOMER SATISFACTION SCORES AND PROACTIVE DELIVERY OF CUSTOMER SERVICE USING ARTIFICIAL INTELLIGENCE and filed on 19 Jun. 2018. This application is hereby incorporated by reference in its entirety.

BACKGROUND

1. Field

This application relates generally to computerized neural networks, and more particularly to a system, method and article of operating computerized neural networks for modelling CSR-customer relationships.

2. Related Art

In an online environment, an enterprise can provide question and answer (QA) services. However, due to the large number of questions and answers provides, manual QA services for customer service can tedious, labor intensive, prone to errors and costly. For example, only 1% of emails, chats, and phone engagements are audited. This can delirious affect metrics, agent sentiment and customer satisfaction. Accordingly, improvements are desired that combine the best of human and artificial intelligence to create an automated, proactive QA process and improve agent and customer experience in real time.

BRIEF DESCRIPTION OF THE DRAWINGS

In one aspect, a computerized method for operating computerized neural networks for modelling CSR-customer relationships includes the step of receiving a user query. The user query comprises a set of digital text from a customer as input into an online CSR system. The method includes the step of filtering out unnecessary content of the user query. The method includes the step of splitting filtered user query in a sentence wise manner. The method includes the step of feeding the tokenized user query into a contextualized word representation model. The method includes the step of generating a set of context-aware feature vectors from the contextualized word representation model. With the set of context-aware feature vectors, the method implements a decision-making function to generate an identified customer query. The method includes the step of receiving an agent response, wherein the agent response is a response to the user query, and wherein the agent response comprises a set of digital text from an agent. With an LSTM network, the method generates a user query tensor vector. With the LSTM network, generating an agent query tensor vector. The method includes the step of concatenating the user query tensor vector and the agent query tensor vector to produce a single tensor, wherein the single tensor is processable by a neural network.

BRIEF DESCRIPTION OF THE DRAWINGS

FIGS. 5 A-B illustrate an example process for operating computerized neural networks for modelling CSR-customer relationships, according to some embodiments.

The Figures described above are a representative set and are not an exhaustive with respect to embodying the invention.

DESCRIPTION

Disclosed are a system, method, and article of manufacture for modelling CSR-customer relationships. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method.

Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Adam (short for Adaptive Moment Estimation) is an update to an RMSProp optimizer. In this optimization algorithm, running averages of both the gradients and the second moments of the gradients are used.

Application programming interface (API) can specify how software components of various systems interact with each other.

Back propagation is a method used in artificial neural networks to calculate a gradient that is needed in the calculation of the weights to be used in the network. Back propagation can be used to train deep neural networks.

Capsule Neural Network (CapsNet) is a machine learning system that is a type of artificial neural network (ANN) that can be used to better model hierarchical relationships.

Cloud computing can involve deploying groups of remote servers and/or software networks that allow centralized data storage and online access to computer services or resources. These groups of remote serves and/or software networks can be a collection of remote computing services.

Convolutional neural network (CNN) is a class of deep, feed-forward artificial neural networks. CNNs use a variation of multilayer perceptrons designed to require minimal preprocessing.

Customer Service Representative (CSR) can interact with customers to handle complaints, process orders, and provide information about an organization's products and services.

Customer satisfaction score (CSAT) is a measure of how products and services supplied by a company meet or surpass customer expectation. Customer satisfaction can be defined as, inter alia: the number of customers, or percentage of total customers, whose reported experience with a firm, its products, or its services (ratings) exceeds specified satisfaction goals, etc.

Deep learning (DL) is a branch of algorithm-based machine learning.

Gated recurrent unit (GRU) can be mechanisms in recurrent neural networks.

Internet of Things (IoT) is the network of physical devices, vehicles, home appliances and other items embedded with electronics, software, sensors, actuators, and connectivity which enables these objects to connect and exchange data. Each element can be uniquely identifiable through its embedded computing system but is able to inter-operate within the existing Internet infrastructure.

Long short-term memory (LSTM) units are a building unit for layers of a recurrent neural network (RNN). An RNN composed of LSTM units is an LSTM network. An LSTM unit can be composed of a cell, an input gate, an output gate and a forget gate. The cell is responsible for "remembering" values over arbitrary time intervals; hence the word "memory" in LSTM. Each of the three gates can be thought of as a "conventional" artificial neuron, as in a multi-layer (or feedforward) neural network: that is, they compute an activation (e.g. using an activation function) of a weighted sum.

Machine learning (ML) can use statistical techniques to give computers the ability to learn and progressively improve performance on a specific task with data, without being explicitly programmed.

Mobile device can include a handheld computing device that includes an operating system (OS), and can run various types of application software, known as apps. Example handheld devices can also be equipped with various context sensors (e.g. biosensors, physical environmental sensors, etc.), digital cameras, Wi-Fi, Bluetooth, and/or GPS capabilities. Mobile devices can allow connections to the Internet and/or other Bluetooth-capable devices, such as an automobile, a wearable computing system and/or a microphone headset. Exemplary mobile devices can include smart phones, tablet computers, optical head-mounted display (OHMD), virtual reality head-mounted display, smart watches, other wearable computing systems, etc.

Natural language processing, a branch of artificial intelligence concerned with automated interpretation and generation of human language. NLP functionalities and methods that can be used herein can include, inter alia: statistical natural-language processing (SNLP), Lemmatization, morphological segmentation, part-of-speech tagging, stochastic grammar parsing, sentence breaking, word segmentation, terminology extraction, machine translation, named entity recognition, natural language understanding, lexical semantics, relationship extraction, sentiment analysis, word sense disambiguation, automatic summarization, coreference resolution, discourse analysis, speech segmentation, text-to-speech, OCR, speech to text, etc.

Recurrent neural network (RNN) is a class of artificial neural network where connections between nodes form a directed graph along a sequence. This allows it to exhibit dynamic temporal behavior for a time sequence. Unlike feedforward neural networks, RNNs can use their internal state (memory) to process sequences of inputs.

RMSProp (for Root Mean Square Propagation) is also a method in which the learning rate is adapted for each of the parameters. RMSProp divides the learning rate for a weight by a running average of the magnitudes of recent gradients for that weight.

Sigmoid function is a mathematical function having a characteristic "S"-shaped curve or sigmoid curve.

Software agent is a computer program that acts for a user or other program in a relationship of agency. Software agents can interact with people (e.g. as chatbots, human-robot interaction environments, etc.) via human-like qualities such as, inter alia: natural language understanding and speech, personality, and the like.

Example Computer Architecture and Systems

Figure 1:
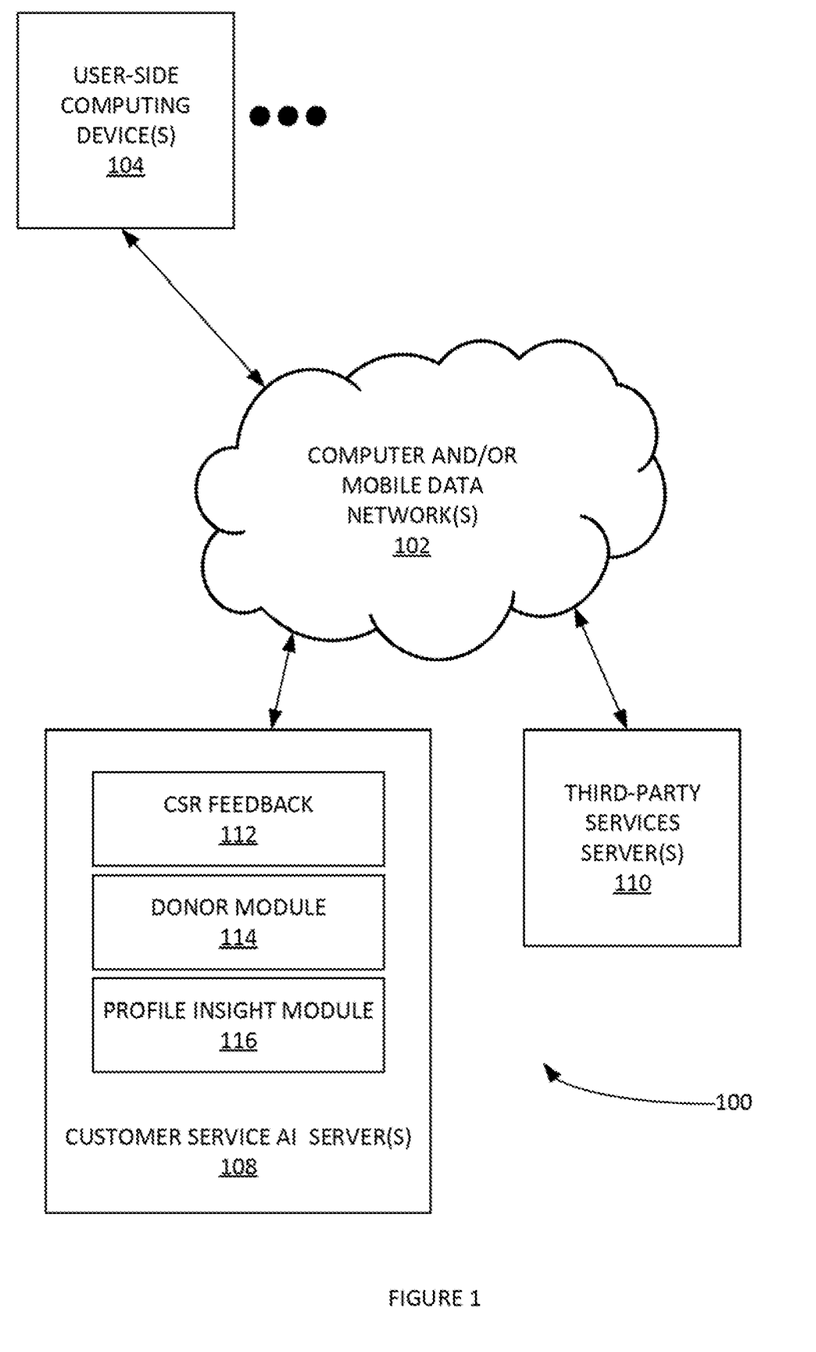
FIG. 1 illustrates an example system used for real-time evaluation of customer satisfaction scores and proactive delivery of customer service using artificial intelligence, according to some embodiments.

FIG. 1 illustrates an example system 100 used for real-time evaluation of customer satisfaction scores and proactive delivery of customer service using artificial intelligence, according to some embodiments. System 100 can use ML/DL to automate routine office work. System 100 can manage an organizational experience such that customer service (CS) employees are freed from 'busy work'. In this way, enterprises can utilize employees for the unique instead of the mundane. System 100 can combine company specific expertise of their customer service representatives (CSRs) with best practices to create CS experiences that are not only painless, but proactive. It is noted that CSR and 'agent' are used interchangeably herein. System 100 can be used to create an interface that assists CSRs in various ways such as those provided infra.

System 100 can include various computer and/or cellular data networks 102. Computer and/or cellular data networks 102 can include the Internet, cellular data networks, local area networks, enterprise networks, etc. Networks 102 can be used to communicate messages and/or other information from the various entities of system 100.

System 102 can include customer service AI server(s) 108. Customer service AI server(s) 108 can communicate with user-side computing system(s) 104. User-side computing system(s) 104 can include microphones that obtain user voice-data. User-side computing system(s) 104 can include mobile devices, IoT devices, smart speakers, personal computers, tablet computers, etc.

Customer service AI server(s) 108 can include various scoring and ranking engines. Customer service AI server(s) 108 can search engines as well.

Customer service AI server(s) 108 can include various analytics functionalities. For example, Customer service AI server(s) 108 can include machine learning systems. Customer service AI server(s) 108 can utilize machine learning techniques (e.g. artificial neural networks, etc.). Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity and metric learning, and/or sparse dictionary learning. DL can be based on learning data representations (e.g. as opposed to task-specific algorithms). DL can be supervised, semi-supervised or unsupervised. Deep learning architectures can include deep neural networks, deep belief networks and/or recurrent neural networks. Customer service AI server(s) 108 can include speaker recognition functionalities and speech recognition functionalities. Customer service AI server(s) 108 can include natural language processing functionalities.

Customer service AI server(s) 108 can provide dashboard interfaces to users. Customer service AI server(s) 108 can include web servers, geo-location systems, email servers, IM servers, database management systems, search engines, electronic payment servers, member management systems, administration systems, machine-learning systems, ranking systems, optimizations systems, text messaging systems, etc. Third-party services server (s) 114 can provided various third-party services (e.g. mapping services, geolocation services, online social networking services, machine-learning services, search engine services, etc.).

Customer service AI server(s) 108 can include a CSR feedback module 112. CSR feedback module 112 can include functionalities to analyze Customer Satisfaction (CSAT) data. This analysis can be used to improve customer interactions and training customer service representatives in real time (e.g. assuming networking and processing latencies, etc.). CSR feedback module 112 can provide feedback on how representatives are performing. This feedback can be based on the criteria provided by a client company while the customer service representative (CSR) is supporting customers. Accordingly, CSR feedback module 112 can change the natural workflows of CSRs in real-time as they interact with customers.

CSR feedback module 112 can enable a customer to ask questions and then validate each question. CSR feedback module 112 can evaluate every sentence of the CSR's response if a question has been answered (e.g. 'true/false', 'yes/no', 'n/a', etc.). A true answer can then be further analyzed for completeness. The answer can be weighted allowing the CSR to follow up prior to ending the conversation.

In addition to analyzing if the customer's query has been completely answered, CSR feedback module 112 can also incorporate additional metrics, crafted by the company to ensure the customer's overall satisfaction and to meet the company's various self-identified goals.

An example use case of a CSR feedback module 112 implementation is now provided.

Customer Query:

"Hey, what kind of return window policy do you have with your mattresses? If I ever needed to return a purchase to you, would I be able to obtain a refund as a gift card? Thanks for your assistance :)"

CSR feedback module 112 can validate the customer query and determines that there are two questions asked by the customer as follows:

Question 1: What kind of return window policy do you have with your mattresses?

Question 2: If I ever needed to return a purchase to you, would I be able to obtain a refund as a gift card?

CSR feedback module 112 can evaluate each sentence of the response after typed or inputted by the CSR.

CSR feedback module 112 can generate the following response(s).

Sentence 1: "We believe in great sleep, guaranteed."

CSR feedback module 112 generate the following evaluation result: Question 1 and Question 2 is not answered.

Sentence 2: "That's why every mattress you purchase from Wayfair comes with a 100-night free trial."

CSR feedback module 112 can generate the following evaluation result: Question 1 is answered, and Question 2 is not answered. Additional Education Provided: Yes Sentence 3: "If you exchange it for a more expensive mattress, you need only pay the difference in price."

CSR feedback module 112 can generate the following evaluation result: Question 1 is answered, and Question 2 is not answered. Additional Education Provided: Yes Additional information on this process is provided infra. CSR feedback module 112 can include a utility that can function within structures that are broader than customer service, for example Human Resources and Non-profit fundraising. CSR feedback module 112 can be fully customizable by the client, the level of understanding nuanced, it is a robust solution to analyze and assist in the full resolution of a customer's query.

CSR feedback module 112 can be used to enable a representative to save a relationship before it sours, providing the best customer service consistently. Every interaction with a customer is an opportunity to slip or shine. We help you catch your CSRs before they fall, training them for success. The Client company sets the metrics which could include, inter alia: if the CSR upsells a product; if the CSR answers customer questions; if the CSR provided alternative options; etc.

Figure 2:
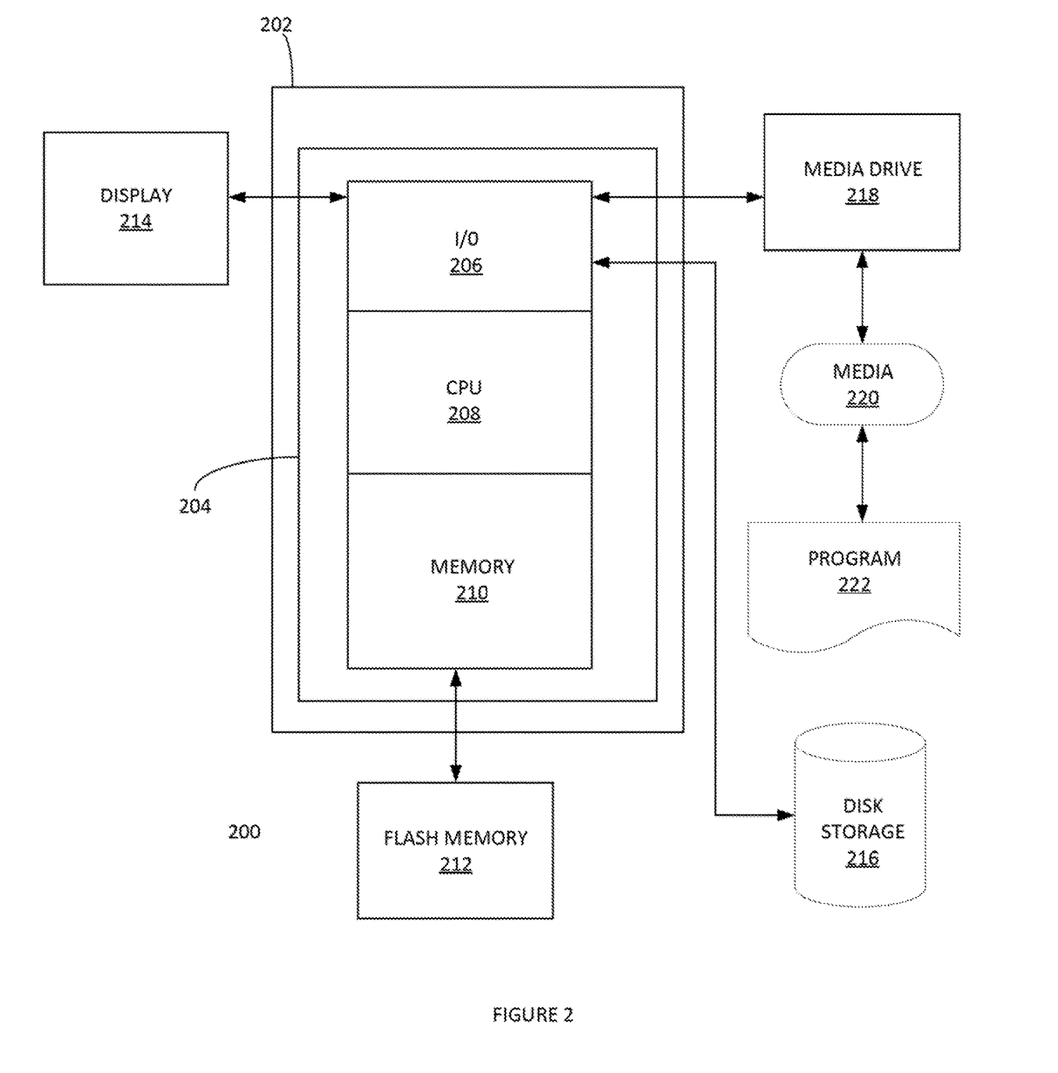
FIG. 2 depicts an exemplary computing system that can be configured to perform any one of the processes provided herein.

FIG. 2 depicts an exemplary computing system 200 that can be configured to perform any one of the processes provided herein. In this context, computing system 200 may include, for example, a processor, memory, storage, and I/O devices (e.g., monitor, keyboard, disk drive, Internet connection, etc.). However, computing system 200 may include circuitry or other specialized hardware for carrying out some or all aspects of the processes. In some operational settings, computing system 200 may be configured as a system that includes one or more units, each of which is configured to carry out some aspects of the processes either in software, hardware, or some combination thereof.

FIG. 2 depicts computing system 200 with a number of components that may be used to perform any of the processes described herein. The main system 202 includes a motherboard 204 having an I/O section 206, one or more central processing units (CPU) 208, and a memory section 210, which may have a flash memory card 212 related to it. The I/O section 206 can be connected to a display 214, a keyboard and/or other user input (not shown), a disk storage unit 216, and a media drive unit 218. The media drive unit 218 can read/write a computer-readable medium 220, which can contain programs 222 and/or data. Computing system 200 can include a web browser. Moreover, it is noted that computing system 200 can be configured to include additional systems in order to fulfill various functionalities. Computing system 200 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Figure 3:
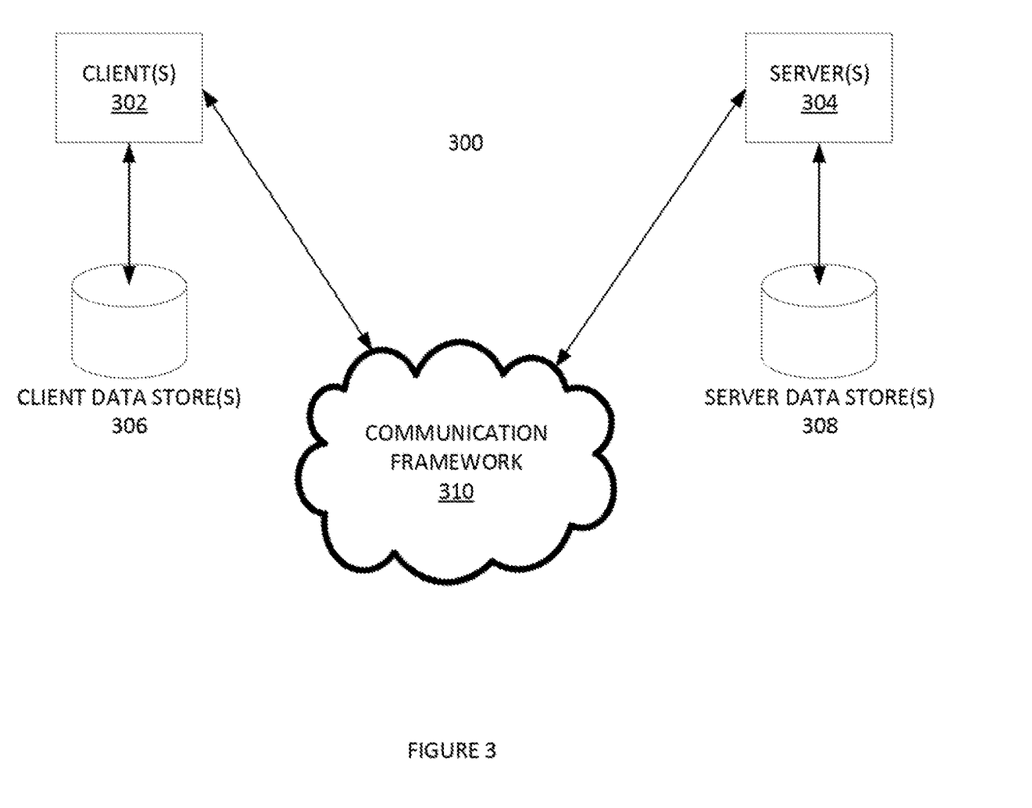
FIG. 3 is a block diagram of a sample computing environment that can be utilized to implement various embodiments.

FIG. 3 is a block diagram of a sample computing environment 300 that can be utilized to implement various embodiments. The system 300 further illustrates a system that includes one or more client(s) 302. The client(s) 302 can be hardware and/or software (e.g., threads, processes, computing devices). The system 300 also includes one or more server(s) 304. The server(s) 304 can also be hardware and/or software (e.g., threads, processes, computing devices). One possible communication between a client 302 and a server 304 may be in the form of a data packet adapted to be transmitted between two or more computer processes. The system 300 includes a communication framework 310 that can be employed to facilitate communications between the client(s) 302 and the server(s) 304. The client(s) 302 are connected to one or more client data store(s) 306 that can be employed to store information local to the client(s) 302. Similarly, the server(s) 304 are connected to one or more server data store(s) 308 that can be employed to store information local to the server(s) 304. In some embodiments, system 300 can instead be a collection of remote computing services constituting a cloud-computing platform.

Customer Application Methods

Various methods are now discussed.

Figure 4:
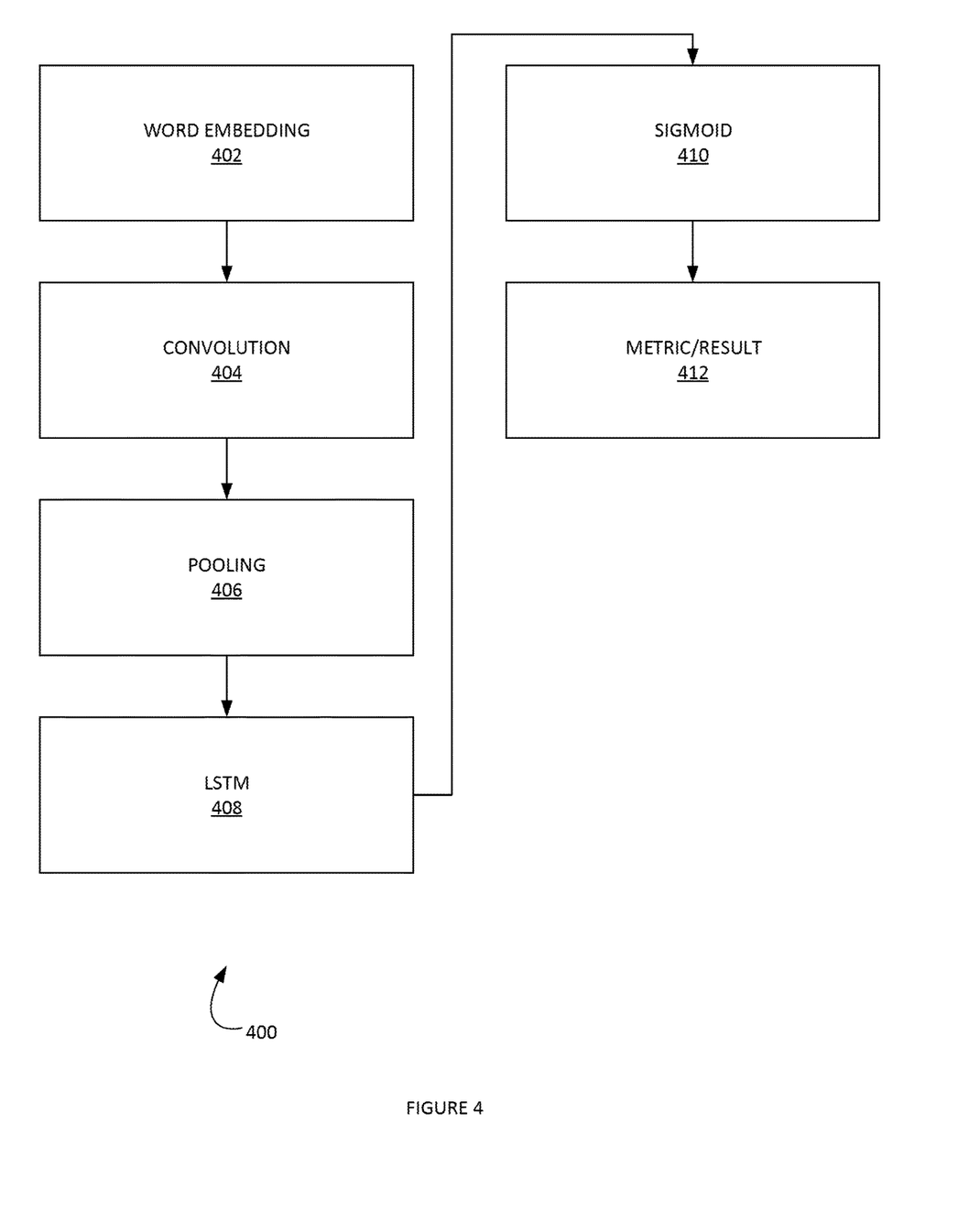
FIG. 4 illustrates an example process for implementing DL operations, according to some embodiments.

FIG. 4 illustrates an example process 400 for implementing DL operations, according to some embodiments. In step 402, process 400 can implement word embedding. In step 404, process 400 can implement various convolutional networks. It is noted that convolutional neural networks are used as feature extractors for images and recurrent networks are widely used for speech and languages. The Convolutional LSTM, originally referred to as a Long-term Recurrent Convolutional Network or LRCN model is used to predict the results for most metrics for implementing real-time analysis of CSAT and improving customer interactions and training customer service representatives.

In step 406, process 400 can implement pooling. In step 408, process 400 can implement LSTM. In step 410, process 400 can a sigmoid layer. For example, the output of LSTM layer is then fed into the sigmoid layer that provides a final confidence score on the available answer options. In step 412, process 400 can provide metrics/results.

Figure 5A:
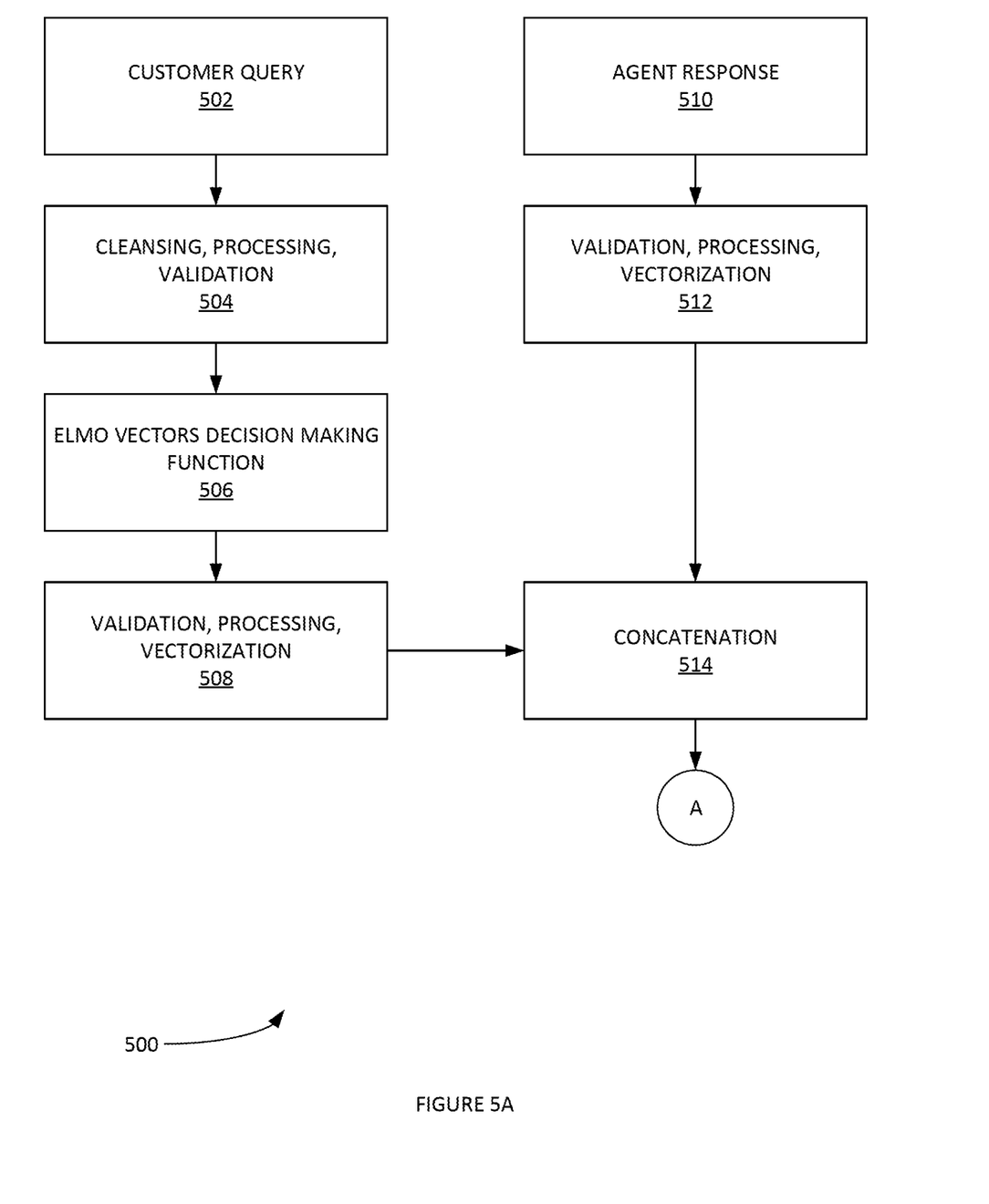
Figure 5B:
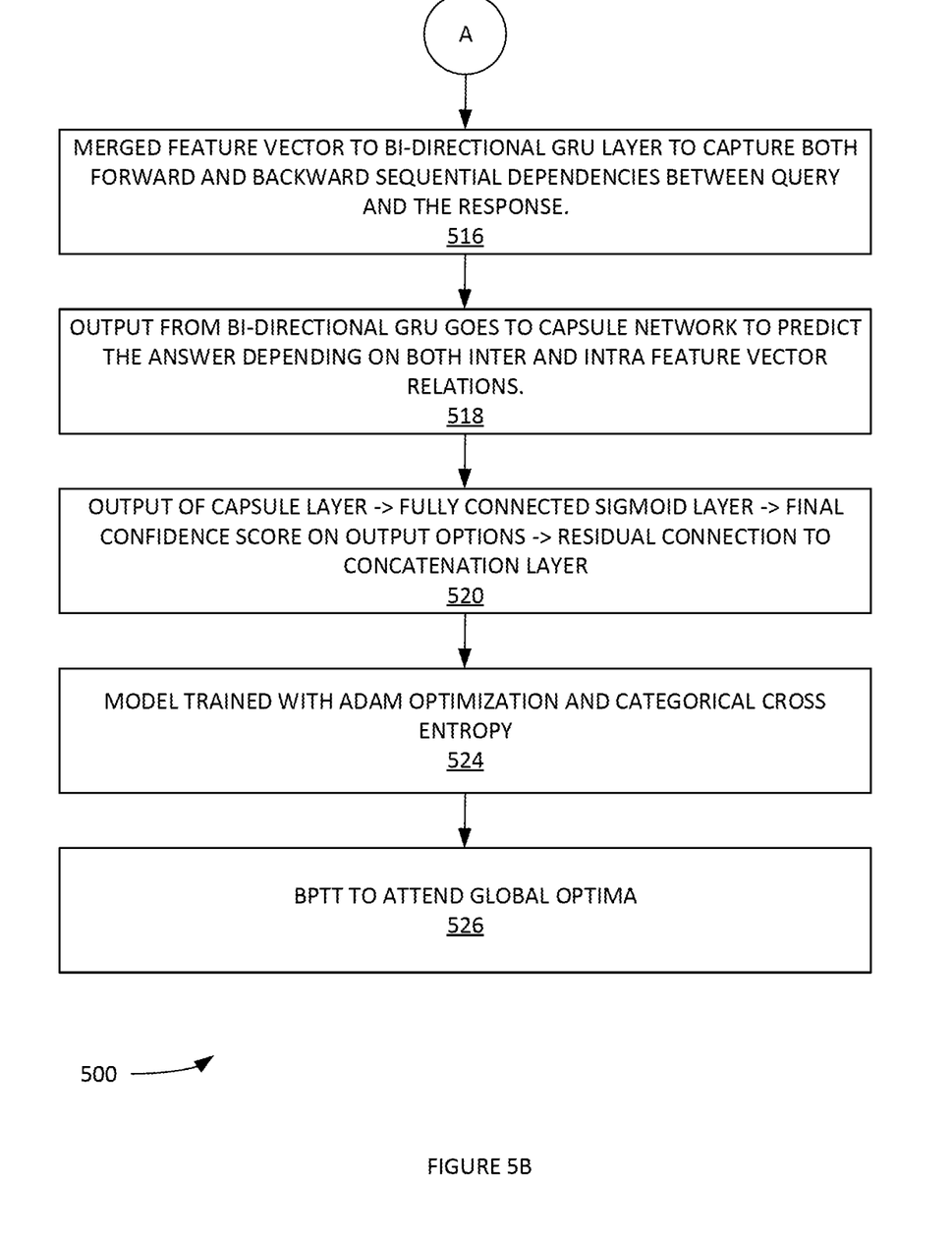

FIGS. 5 A-B illustrate an example process 500 for operating computerized neural networks for modelling CSR-customer relationships, according to some embodiments. In step 502, process 500 can receive a user query. In this step, process 500 obtains the text from customer as input.

In step 504, process 500 can implement a cleansing, processing, validation step on the text of the user query. Process 500 filters out the unnecessary punctuation, symbols, emojis, HTML tags and modifies the relevant identifiers, numbers, links etc. provided in the user query text. The output is split by sentence wise using a smart sentence tokenizer. This is then fed into to an ELMo embedding. In one example, a pre-trained ELMo model in tensorflow hub can be used to obtain deep, contextualized and character-based embedded vectors of dimension 1024 for each sentence using a word average mechanism. Step 504 generates context-aware feature vectors.

ELMo (Embeddings from Language Models) is a deep contextualized word representation. ELMo can model various characteristics of word use (e.g. syntax and semantics). It can also determine how word uses vary across linguistic contexts. In this way, ELMo can be used to model polysemy. Word vectors can be learned functions of the internal states of a deep bidirectional language model. The deep bidirectional language model is pre-trained on a large text corpus. ELMo models can be used for question answering, textual entailment, sentiment analysis, etc.

In step 506, ELMo vectors can be used to implement a decision-making function. The sentence wise ELMo vectors can be passed to a LSTM/sigmoid) layer (e.g. LSTM+fully connected sigmoid) to predict whether it is or is not an applicable question. LSTM is used to capture the sequential dependency in the sentence and the fully-connected sigmoid layer provides a confidence score of it being a question in the range of [0,1]. The model architecture can be optimized with RMSprop optimizer. After obtaining the sentence wise confidence score for applicable question, a decision-making function build the actual query based on the business logic. Step 506 generates an identified customer query.

In step 510, an agent response is received. The response can be a text-based response in a digital format.

In steps 508, process 500 can implement validation, processing, vectorization. Step 508 can implement LSTM (e.g. thirty-two (32) cells). Step 508 generates a feature vector with semantic relation and sequential dependency.

In step 512, process 500 can implement validation, processing, vectorization. Step 508 can implement LSTM (e.g. fifty-six (56) cells). Step 512 generates a feature vector with semantic relation and sequential dependency.

More specifically, in steps 508 and 512, the identified queries and agent's response text are passed through several text validation and processing steps followed by padding to generate a word vector of dimension 20 for each query and another word vector of dimension 30 for each agent response. The dimensions are determined based on a statistical analysis of a historical data. In other examples, other dimensions can be utilized. The word vectors are embedded using a library for learning of word embeddings and text classification (e.g. Fasttext, etc.) and a science gateway framework that enables users to access grid and cloud infrastructures (e.g. a Grid and Cloud User Support Environment (gUSE) mechanism, etc.). These are fed to a LSTM network to generate feature vectors in the form of tensors both semantic and sequential dependency information.

Accordingly, in step 514, the outputs of steps 508 and 512 can be concatenated. The tensors from LSTM networks are concatenated to produce a single tensor that can be processed through the CCANN architecture.

In step 516, the merged feature vector of step 514 (e.g. includes user query and agent response) is provided to a Bi-Directional GRU layer to capture both forward and backward sequential dependencies between the user query and the agent response.

In step 518, the output from Bi-Directional GRU is communicated to a capsule neural network to predict an answer. The answer can depend on both inter and intra feature vector relations.

In step 520, can receive the output of capsule neural-network layer. Step 520 can implement a fully connected sigmoid layer to generate a final confidence score on output options. Step 520 can implement a residual connection to a concatenation layer.

In step 522, process 500 can implement a model trained with stochastics optimization (e.g. ADAM optimization) and cross entropy (categorical cross entropy, etc.).

In step 524, process 500 can implement BPTT to attend global optima.

Figure 6:
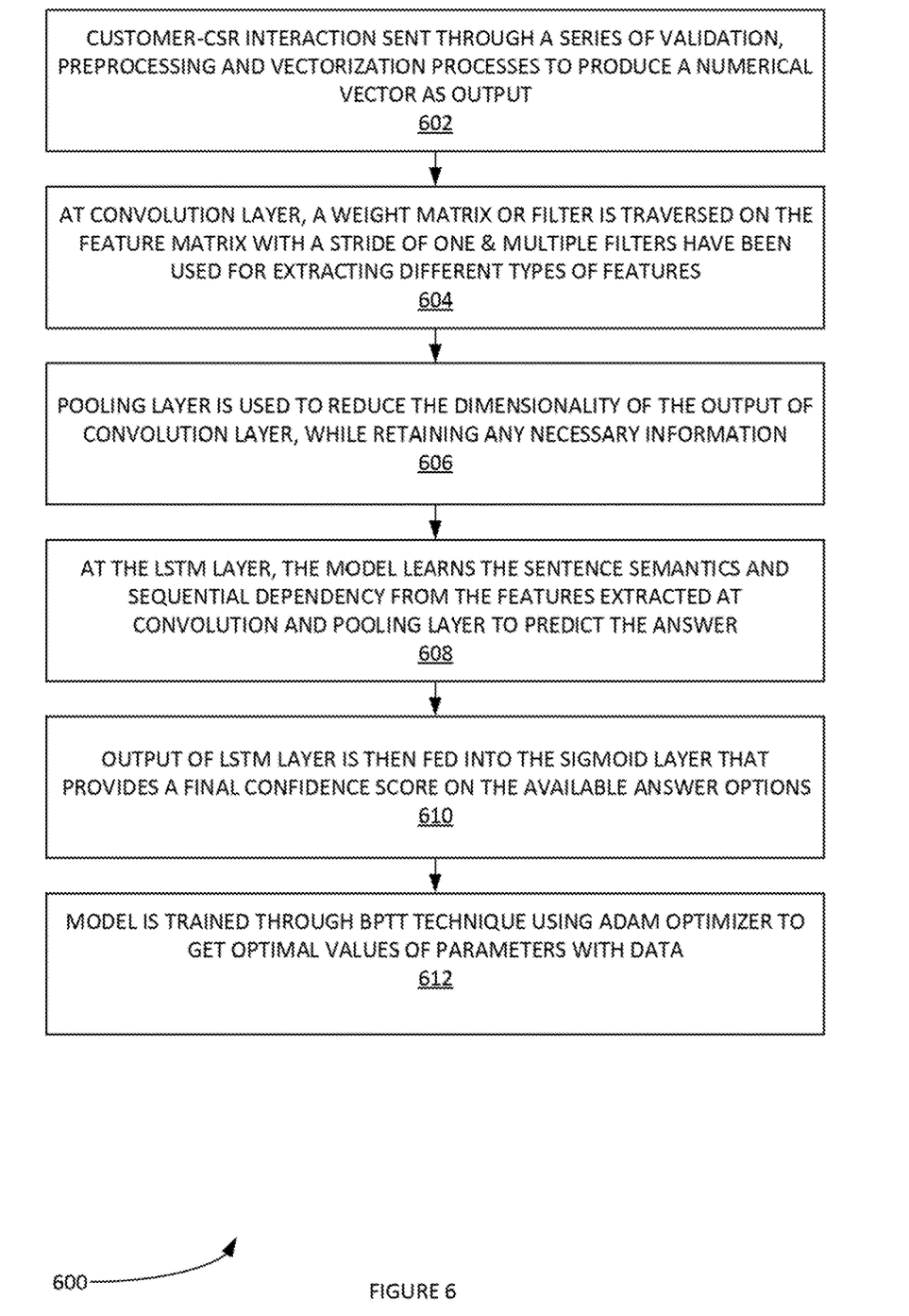
FIG. 6 illustrates an example process for modelling CSR-customer relationships, according to some embodiments.

FIG. 6 illustrates an example process 600 for modelling CSR-customer relationships, according to some embodiments. In step 602, customer-CSR interaction sent through a series of validation, preprocessing and vectorization processes to produce a numerical vector as output. A numerical vector is transformed into a feature matrix though an embedding layer and 128-dimension word vector is trained through back propagation. Process 700-900 can be used to implement portions of step 602.

In step 604, at convolution layer, a weight matrix and/or filter is traversed on the feature matrix with a stride of one. Multiple filters can be used for extracting different types of features. For example, step 604 can use fifty (50) filters of length five (5) with a than activation function. In step 606, the pooling layer is used to reduce the dimensionality of the output of convolution layer, while retaining any necessary information. In step 608, at the LSTM layer, the process 600 has the model learn the sentence semantics and sequential dependency from the features extracted at convolution and pooling layer to predict the answer. In this layer, fifty (50) LSTM boxes can be used in sequential learning.

In step 610, the output of LSTM layer is then fed into the sigmoid layer that provides a final confidence score on the available answer options. The option with the higher confidence score is considered as the final prediction.

In step 612, process 600 trains the model through BPTT (Backpropagation Through Time) technique using an Adam optimizer to obtain optimal values of parameters with data. The model of process 600 can gradually learn to improve accuracy. In alternate embodiment, an LSTM layer can be replaced with GRU layer with attention network to so that the important features will obtain more attention for better prediction.

Example Use Cases

CSR feedback module 112 can be used across multiple channels including, inter alia: voice calls, email, text, chat, in-application channels, and/or social media channels. CSR feedback module 112 can be accessed via various platforms such as, inter alia: personal devices, handhelds, AR/VR, etc. In the email, text, and/or chat interactions; the processes can be performed after a representative types punctuation that declares the end of a sentence, every sentence. In voice interactions, these processes can be initiated in the natural breaks of dialogue (e.g. where one person stops speaking before the other one begins, etc.). Each metric can be scored by CSR feedback module 112 in a way customized by the company providing an extra weight to aspects the company determines as having more value. A CS representative can see their score as it is being calculated, thus giving the CS representative (CSR) the opportunity to address areas where their score is not at a one-hundred percent score before they finish interacting with the customer. The CS representative can be automatically shown and thus know how to achieve a perfect performance review score. The scoring can also have a parameter for context warnings. Accordingly, if the CS representative starts to explain something that has no relevance to the question at hand, then a context warning will be shown. This can reduce the amount of time spent per customer interaction. There is also a content-warning designed to catch if unprofessional language is being used by the CSR and/or if the customer is being abusive to the employee. A natural byproduct of these processes is that all interactions are transcribed for later analytics (e.g. machine learning training data, etc.).

Standard metrics can include (e.g. each metric can be weighted for the final score):

Customer Query Resolved?
Probed to understand query?
Alternate solution(s) proposed?
Additional education provided?
Initiated new sale?
CSR provided their name?
CSR Addressed customer by name?
Enable context warning
Enable content warning
Did the CSR notify customer of potential risks?
Does the customer understand legal warnings or disclaimers?
Did the CSR provide all relevant options to the customer to help them solve their problem?
Did the CSR address limitations of product?
Did the CSR accurately represent the product?
Was the CSR polite?

It is noted that each enterprise can have metrics that are repetitive, as do departments within said enterprise. CSR feedback module 112 can digest historical data, when the historical data is not available. Standard metrics provided by the CSR feedback module 112 can accommodate the lack until customized metrics are developed. CSR feedback module 112 metrics can be extended to include other metrics, inter glia: accountability, functionality and scalability.

Quality assurance aspects are now discussed. It is noted that a Quality assurance (QA) Department can oversee the quality of customer service interactions, this is currently accomplished with some combination of direct surveillance of interactions, key word flags, and post interaction analysis. Unless a supervisor is actively listening to a call/response the likelihood of a CSR having any real-time feedback is almost non-existent (e.g. on occasion a customer will bluntly say if their needs have been met and to what degree, but this is rarely the ideal scenario and they are more likely to express dissatisfaction than positive feedback). The scoring system is a multi-functional way to analyze the results of customer service at the same time improving results real time. With immediate access to total scores for overall achievement and subcategories denoting each metric, QA departments can be greatly reduced or replaced by CSR feedback module 112 completely.

Conversely, if a CSR is struggling to meet their goals, the metrics can be relied on to help understand what is the lacking element helping management address problems without having to listen to so many individual calls.

Protecting the CSR is now discussed. System 100 can enable an enterprise's CSRs to be treated with respect and know it is sometimes necessary for management to intervene on behalf of the CSR with a customer in a polite manner. The interface can also help escalate problems to management based on how rude the customer was to the representative (e.g. when the customer makes sexually inappropriate comments, says explicative terms, states harassing or hostile phrases, etc.). In this way, system 100 can help to reduce CSR turnover.

The use of system 100 for CSR training now discussed. CSR feedback module 112 can be used to train employees and enable freeform answers to be understood by an AI system. The metrics/scoring can be applied, and the representative can repeatedly reply to the question(s) until the CSR has been properly answered and all auxiliary issues have been dealt with in accordance with their custom metrics. This addresses instances where there is more than one possible correct answer to a question. When customers call representatives, there could be a set of metrics that measure customer satisfaction of the product, not just the interaction of the employee.

Training Chatbot utilization in system 100 is now discussed. It is noted that chatbot content can be created using a domain specific word corpora. A chatbot can apply the most likely answer to a query based on how closely it resembles the script. CSR feedback module 112 can run the answers provided by the chatbot through a scoring system and analyze if the query was actually resolved. If the query was not resolved, then there would be two possibilities as now discussed. $1^{st}$: the question returns to the chatbot giving it another chance to answer the question, this can be done prior to the customer seeing the response, saving the customer from seeing the lackluster answer. $2^{nd}$: the support call can be forwarded to a human representative. At which time, when the human responds the answer is processed by the AI and scored ensuring that the customer has a satisfactory answer. The answer can then be added to the database for the chatbot. If the answer was due to extenuating circumstances it would automatically flag a human representative every future time it, or if something close to it was presented.

A message driven workflow in system 100 is now discussed. It is noted that when a customer initiates a query a unique identifier (e.g. a ticket) is automatically created, this occurs within the platform of initial communication (e.g. voice call, email, third-party application, etc.). This support ticket is assigned to the query to assist in the automatic upgrading of calls and to facilitate tracking of final resolution of the query. The support tickets can be automatically upgraded when a customer has a problem that the CSR can't resolve or if a new issue is discovered during the course of the initial inquiry. CSR feedback module 112 can direct support tickets to the appropriate channel based on the content of the question the ticket is addressing. If an additional query or issue arises that the CSR cannot address CSR feedback module 112 can automate transferring the customer to the appropriate place for resolution at the end of the current interaction. CSR feedback module 112 can alert the current CSR that it can transfer the customer at the conclusion of their call/chat etc. and the AI can initiate the transfer. This can alleviate the CSR of the task of transferring (and possibly dropping) the call and/or for forwarding to the right place for resolution and provides full satisfaction of the customer's needs rather than having the customer start over with an additional call/chat etc. This message driven workflow is an auxiliary feature of CSR feedback module 112 and aids its primary function (ensuring that all questions asked by the customer are answered properly and all needs are fully addressed).

Example human Resources applications of system 100 are now discussed. It is noted that various types of businesses have human-resources departments from hospitals to shipyards to universities to corporations. Human-resource departments are in every entity of size. These are the people you contact to find out how many vacation days you have, what the options for maternity leave are and to increase your 401K investments. They also perform numerous tasks regarding recruitments and dismissals. CSR feedback module 112 is able to continually float on their screen to ensure that workforce needs are addressed in a fair and accurate manner. HR representatives can then deal directly with discrimination and personnel problems, areas where there is both a legal and moral obligation to protect both the company and the employees.

The predictions can be sentence wise, while system 100 can implement a residual connection from this layer to concatenation layer to learn the sequential dependencies between sentences.

It is noted that CSR feedback module 112 is customizable. CSR feedback module 112 can ensure that specified enterprises are in compliance while walking the legal tightrope of honor codes within the workplace. For example, from a basic task (e.g. "did the CSR remind the customer that the enrollment cutoff to change health insurance programs is fast approaching?"; to a nuanced task (e.g. "Is it time for us to part ways?", etc.). CSR feedback module 112 can ensure that the HR representative is doing their job in concordance with the laws of the land and the company charter. Enterprises can use chatbots to facilitate interactions with internal questions (e.g. like HR). CSR feedback module 112 can be used to train chatbots and to effortlessly integrate the chatbots with humans. Once the chatbot has reached the end of its programming, CSR feedback module 112 can then help identify the query that the chatbot did not understand and hand it off to the proper human representative (e.g. see discussion(s) of chatbots provided herein).

Example supply chain and research and development (R&D) support applications are now discussed. It is noted that problems are routinely mentioned in calls with regard to particular products. Accordingly, CSR feedback module 112 can automate the notifying supply chains of defects of said products. CSR feedback module 112 can also notify R&D of defects to implement changes before more sub-par products are re-ordered. CSR feedback module 112 can also create an early alert system for a products. For example, if recalls are issued, a metric could be added to notify the customer of the recall and to facilitate the replacement of the original item.

Example distribution/freight forwarding, import/export applications are now discussed. It is noted that delays may be a part of freight forwarding and issues with customs documents can occur. To reduce delays, the scoring system CSR feedback module 112 can float on the user's screen when creating a document of lading to ensure that all the questions are answered in accordance with local laws and ordinances based on the territory the freight is moving through. Scoring the interaction to ensure that the representative notified the customer for particulars necessary for the transport of their item, such as the amount of fuel in the tank of a car, this would change weights, hence costs to ship. Also, to ensure the customer understands weight limitations, that the car must be empty. Has the car received modifications that would make ownership of it illegal at its destination? As the place of receipt can refuse illegal shipments or have them confiscated or fine the recipient. If the client properly identifies the embargos, a one-percent customer satisfaction (CSAT) score should have no problems with shipping. This can be used on top of their current freight forwarding programs that currently schedule and facilitate customs. Laws are constantly changing, changing a metric in CSR feedback module 112 is quick at enabling companies to be in compliance without downtime. Based on the customer's workflow we would create a machine learning powered messaging system to initiate tickets and tasks for various stakeholders/departments.

Local Government applications of CSR feedback module 112 are now discussed. Local government bureaucracies and their concomitant regulations/procedures can be confusing and obtaining a consistent answer across multiple representatives is next to impossible. Oftentimes, they are restrictions about providing advice (e.g. only supposed to inform the constituency of rules when asked, etc.). CSR feedback module 112 can determine the difference between advising on a particular situation and providing rules in terms the constituent understands. Accordingly, when a person contacts the government for a permit, to file a tax or to better understand the rules for horses on city streets. CSR feedback module 112 can help ensure that their questions are addressed in a uniform manner which adheres to all of their rules. Donor module 114 (see infra) can run simultaneously with CSR feedback module 112 to gather and to score the answers of the constituent or prospective developer/business/homeowner to understand the various issues from the point of view of the constituent scoring (not just with CSR feedback module 112) on the CSR but scoring the needs of the constituent. CSR feedback module 112 can determine what the constituent says what they see as an issue, and, if so, this can be for the interaction to be escalated to a council member. Scoring the different parameters of various parts of conversations enables trouble shooting to occur to address issues which might have otherwise never percolated to the surface.

Law Enforcement and Fire services applications of CSR feedback module 112 are now discussed. It is noted that CSR feedback module 112 applications can be used to train security guards with scoring through exercises to ensure that they understand where the line is between doing their job and illegally detaining someone.

Various school/education applications of CSR feedback module 112 can are now discussed. CSR feedback module 112 can assist students analyzing whether they comprehend the essay questions that they are answering. For example, CSR feedback module 112 can determine if the students are addressing the issue at hand. In one example, a class can be asked to write a book report on the subject and character contrasts in "Pride and Prejudice" by Jane Austen. The deep learning functionalities of CSR feedback module 112 can address character descriptions, in the very same way that it would learn product details or rules and regulations. CSR feedback module 112 can define the "Pride" of Mr. Darcy, the instances which showed his conceit, the "Prejudice" of Elizabeth Bennet, how Mr. Wickham was a scoundrel. The questions can be set up by the teacher and the CSR feedback module 112 can float on the screen informing the student when they have used enough samples to support their arguments for each and if they were not obtaining one-hundred percent of what the student would know what was required of them. CSR feedback module 112 can inform student that they are currently obtaining a B+ grade and not an A grade. If the student continues to struggle, CSR feedback module 112 would enable the teacher to address the situation before the paper was turned in. CSR feedback module 112 can work in conjunction with the software that teachers currently use to detect plagiarism and grammatical errors. The ability for a student to obtain immediate feedback on essay answers, without the embarrassment of obtaining a bad grade in front of the rest of the class. In this case the student would be the "CSR" and the teacher would be both the "Customer" and the "Manager".

Various Insurance industry examples are now discussed. CSR feedback module 112 can help in compliance, auditing, quality assurance adherence to rules and ordinances billing, and customer enquiries. CSR feedback module 112 can also help insurance adjusters dealing with repair shops setting people up with rental cars, training adjusters to be in the field etc.

Various accounting, legal and professional services are now discussed. It is noted that many accounting, legal and professional services employees do routine things on a daily basis. The quality assurance (QA) aspects of CSR feedback module 112 can be mounted onto any interface a representative. This can be used to generate a dynamic report checklist with scoring for the legal professionals after an accident/incident. CSR feedback module 112 can obtain doctors/chiropractors/physical therapists reports and provide evidence to back up claims of damages that were incurred. CSR feedback module 112 can provide the interface and the necessary follow up for this in real time and with our scoring insures that paperwork necessary for litigation is filed properly and completely.

Example leisure and hospitality industry applications are now discussed. CSR feedback module 112 can execute on the user's computer screen of any hotel board. CSR feedback module 112 can listen to the requests made by phone and smart home devices and make sure that they were being adequately accommodated. CSR feedback module 112 can track inventory and help planning. For example, when someone requested a separate mini-fridge in their room (e.g. something that many diabetics and others with special needs require as a medical necessity), the hotel can make sure that the clerk asked why (e.g. so they could take it back if someone with a more urgent need wanted it) and learn to serve the populations of the various conventions that are often occurring simultaneously. This can mirror on the devices of support staff that would actually bring the unit/supplies etc. to the customer where they could scan a barcode for the unit and another for the room. This information can help the relevant staff with booking, if a group known for high rates of diabetes (e.g. poker players) are having an event at a hotel casino, they should try to book the smaller convention rooms inside the facility with a healthier subset of people (bodybuilders).

Example survey analysis applications are now discussed. It is noted that enterprises may wish to understand the metrics of what they are accomplishing. They may wish to use their limited resources and make mid-course corrections to achieve their goals. Many times, the tool used for this type of analysis is a survey, they can be simple "Are you happy? Yes or No" to multi-page endeavors that take several hours to complete. Unfortunately, to be the most useful, they need to be answered consistently and thoroughly by the right people in a timely manner. CSR feedback module 112 can be turned to face the surveyed individuals, so the metrics that are being surveyed would be the questions within CSR feedback module 112. As the survey progresses and is immediately scored, the analytics that are immediately computed can prompt new auxiliary questions. For example, when someone is surveying the results of a new drug and an unforeseen side effect is observed the survey could organically grow to include variables for this unforeseen side effect and the measurements of it so the other surveys that are being administered in different places would now include these new variables.

Example public relations are now discussed. CSR feedback module 112, can create a dynamic checklist with a scoring system that would facilitate a synchronized operation across all channels and all personnel.

CSR feedback module 112 can include applications in each domain where an entity, such as a company, government or non-profit etc., interacts with people and are given particular goals. For example, in a non-profit situation where people are calling for fundraisers or doing a telethon, having a scoring system will allow the representatives to go off of script, allowing them to keep the call natural, and still scoring the representative to insure the highest possible donation. Understanding that donation calls, unlike sales calls the donor wants to feel a connection with the charity and to score the interaction based on metrics to increase this connection. It can be determined if the CSR asks the donor to attend a function of the charity based on their interests or location etc. It can be determined if the CSR asks the donor why they are supporting the cause. All of these type of prompts can increase donor engagement and annual donation amounts per donor. A typical call currently to a fundraiser looks like this:

Donor: "I would like to make a donation of $100."
CSR/volunteer: "Thank you, which donor gift would you like at that level?"
Donor: "Coffee mug."
CSR/volunteer: "Great, I'll need your credit card number and address for the donor gift." (This information would be entered into their donor software program and the credit card would be processed).

CSR feedback module 112 can be used to modify/change the interaction. As the metrics are available on the dashboard of the donor software to increase donor involvement. The CSR/Volunteer can see that they were being evaluated not just in properly taking the credit card information and sending out their donor gift but on developing a relationship with the donor.

An example of the donor module 114 methods is now discussed. The donor module 114 can be viewed as the inverse of CSR feedback module 112. The donor module 114 can obtain the above conversation (e.g. as discussed supra) and, instead of evaluating and scoring the CSR/volunteer, it scores the donor. This scoring can be used in multiple applications from judging their interest in volunteering in the future to scoring their overall engagement with the entity's various programs of the charity. The activities that the donor participates in can be used to forecast future involvement or scoring the effectiveness of various programs ran by the charity.

An example of the profile insight module 116 is now discussed. When the CSR feedback module 112 and the donor module 114 are run simultaneously, then the profile insight module 116 can be implemented. The profile insight module 116 uses the scores of the CSR feedback module 112 and the donor module 114 to assist the CSR/volunteer with insights into the profile of the donor to help direct conversations to their most fruitful conclusions. For example, when the donor/client indicates a preference for one thing the CSR can follow up knowing that a score high in one thing often correlates with other interests.

Because all these activities are in real time, the workflows can be continuously augmented. At the end of each sentence or pause in the conversation the scoring is updated. This immediate feedback alters conversations proactively before they conclude. While the CSR is encouraging deeper engagement, the CSR can see that the donor/customer's answer increases the likelihood that they would like to do a particular activity. At every instance in the workflow, the CSR is obtaining feedback on how they perform, and how they can evolve the donor/customer's engagement from the current level up to the maximum. The profile insight module 116, having the information from the donor module 114, includes ways not to err in over selling and turning the client/donor off by being too pushy actually teaching the CSR/donor the delicate dance of sales.

Example Embodiment of a Public Works Disaster Scenario

In a public works context, an individual can be sent out to inspect a problem. The inspector can be calling their base of operations to inform of the extent of the damage. The promptings on the CSAT score can incorporate whether the representative asked all the necessary questions regarding the specific public works problem. This can in turn be combined with profile insight module 116 to facilitate the respective turnaround time. It can be determined inspector was able to ascertain the full extent of the damage visually, etc. The AI functionalities can be used to predict dynamic evaluation criteria based on the context of the circumstances such as, inter alia: is a life at risk, would the public need to be evacuated etc. Phase two (2) and phase (3) can be to help integrate the next step of tasks to resolve issues.

Donor module 114 can provide and manage a widget or other UI window 'floating' on the screen of the representative speaking with the inspector. This can then prompt the necessary questions and the score generated would reflect what would be necessary to fix the problem. This can be used to assist triage situations such as an earthquake where there are multiple infrastructure emergencies.

Instead of the client calling into customer support, the process can be reversed to insure the field representative was accurately identifying the problem they were seeing and having the ability to upload visual data in support of the problem. This can be beneficial if a major sewage line or water main erupted and not only was traffic backed up but needed to ascertain what physical damage was done and what future damage could manifest if the problem was not dealt with in particular situations. For example, a rate of flooding in an area can be calculated. The calculations implemented by the AI functionalities of system 100 about a conversation do not necessarily have to be about just politeness but can help forecast how severe a problem could grow if it was not dealt with, a way to triage after an earthquake.

It is noted that CSR feedback module 112 changes that interaction. If metrics were floating on the dashboard of the donor software to increase donor involvement. The CSR/Volunteer could see that they were being evaluated not just in properly taking the credit card information and sending out their donor gift but on developing a relationship with the donor. Donor module 114 is the inverse of CSR feedback module 112. PRODUCT 2 takes the above conversation and instead of evaluating and scoring the CSR/volunteer it scores the donor. This scoring can be used in multiple applications from judging their interest in volunteering in the future to scoring their overall engagement with the entity's various programs of the charity. The activities that the donor participates in could be used to forecast future involvement or scoring the effectiveness of various programs ran by the charity.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed is:

1. A computerized method for operating computerized neural networks for modelling customer service representative (CSR) customer relationships comprising:
    receiving a user query, wherein the user query comprises a set of digital text from a customer as input into an online CSR system;
    filtering out unnecessary content of the user query;
    splitting filtered user query in a sentence wise manner;
    feeding the tokenized user query into a contextualized word representation model;
    generating a set of context-aware feature vectors from the contextualized word representation model;
    with the set of context-aware feature vectors, implementing a decision-making function to generate an identified customer query;
    receiving an agent response, wherein the agent response is a response to the user query, and wherein the agent response comprises a set of digital text from an agent;
    with a long short-term memory (LSTM) network, generating a user query tensor vector;
    with the LSTM network, generating an agent query tensor vector;
    concatenating the user query tensor vector and the agent query tensor vector to produce a single tensor, wherein the single tensor is processable by a neural network;
    providing the single tensor to a Bi-Directional Gated recurrent unit (GRU) layer to capture both forward and backward sequential dependencies between the user query and the agent response output to a capsule neural network to predict an answer;
    receiving the answer from the capsule neural network;
    implementing a connected sigmoid layer on a plurality of answers to generate a final confidence score for each of the plurality of answers;
    implementing an optimization model on a plurality of confidence-scored answers trained with a stochastic optimization and a cross entropy model to select an optimum answer; and
    formatting the optimum answer for output via a computer system of the user.

2. The computerized method of claim 1, wherein the contextualized word representation model comprises an ELMo (Embeddings from Language Models) model.

3. The computerized method of claim 2, wherein the ELMo model models a specified set of characteristics of each word use in the tokenized user query to determine how each word use in a context of the user query.

4. The computerized method of claim 3, wherein the decision-making function used to generate an identified customer query comprises an LSTM network, wherein the LSTM networks comprises a set of LSTM units, and wherein the LSTM units comprises a building unit for layers of a recurrent neural network.

5. The computerized method of claim 4, wherein the LSTM network captures a sequential dependency in each sentence and a sigmoid layer that provides a confidence score of each sentence being a question.

6. The computerized method of claim 5, wherein the filtered user query is split in a sentence wise manner using a smart sentence tokenizer.

7. A computerized method for operating computerized neural networks for modelling customer service representative (CSR) customer relationships comprising:
    receiving a user query, wherein the user query comprises a set of digital text from a customer as input into an online CSR system;
    filtering out unnecessary content of the user query;
    splitting filtered user query in a sentence wise manner;
    feeding the tokenized user query into a contextualized word representation model;
    generating a set of context-aware feature vectors from the contextualized word representation model;
    with the set of context-aware feature vectors, implementing a decision-making function to generate an identified customer query;
    receiving an agent response, wherein the agent response is a response to the user query, and wherein the agent response comprises a set of digital text from an agent;
    with a long short-term memory (LSTM) network, generating a user query tensor vector;
    with the LSTM network, generating an agent query tensor vector;
    concatenating the user query tensor vector and the agent query tensor vector to produce a single tensor, wherein the single tensor is processable by a neural network; and
    providing the single tensor to a Bi-Directional Gated recurrent unit (GRU) layer to capture both forward and backward sequential dependencies between the user query and the agent response output to a capsule neural network to predict an answer,
    wherein the contextualized word representation model comprises an ELMo (Embeddings from Language Models) model,
    wherein the ELMo model models a specified set of characteristics of each word use in the tokenized user query to determine how each word use in a context of the user query,
    wherein the decision-making function used to generate an identified customer query comprises an LSTM network, wherein the LSTM networks comprises a set of LSTM units, and wherein the LSTM units comprises a building unit for layers of a recurrent neural network, wherein the LSTM network captures a sequential dependency in each sentence and a sigmoid layer that provides a confidence score of each sentence being a question, and wherein the filtered user query is split in a sentence wise manner using a smart sentence tokenizer.

* * * * *